(12) United States Patent
Guo et al.

(10) Patent No.: US 11,422,791 B2
(45) Date of Patent: Aug. 23, 2022

(54) UPGRADING A SEQUENCE OF MICROSERVICES IN A CLOUD COMPUTING ENVIRONMENT

(71) Applicant: International Business Machines Corporation, Armonk, NY (US)

(72) Inventors: Yingchun Guo, Beijing (CN); Jing Jing Wei, Beijing (CN); Yue Wang, Beijing (CN); Shao Jun Ding, Beijing (CN); Jian Nan Guo, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/139,533

(22) Filed: Dec. 31, 2020

(65) Prior Publication Data

US 2022/0206782 A1 Jun. 30, 2022

(51) Int. Cl.
| | | |
|---|---|---|
| *G06F 8/65* | (2018.01) | |
| *G06F 8/656* | (2018.01) | |
| *G06F 9/52* | (2006.01) | |
| *G06F 9/48* | (2006.01) | |
| *G06F 8/71* | (2018.01) | |

(52) U.S. Cl.
CPC ............... *G06F 8/656* (2018.02); *G06F 8/71* (2013.01); *G06F 9/4881* (2013.01); *G06F 9/524* (2013.01)

(58) Field of Classification Search
CPC .......... G06F 8/656; G06F 8/71; G06F 9/4881; G06F 9/524
USPC ....................................................... 717/170
See application file for complete search history.

(56) References Cited

U.S. PATENT DOCUMENTS

| | | | |
|---|---|---|---|
| 2015/0143355 A1 | 5/2015 | Tingstrom | |
| 2017/0269926 A1* | 9/2017 | Xu | ........................ H04L 41/082 |
| 2018/0067736 A1 | 3/2018 | De Zaeytijd | |

(Continued)

FOREIGN PATENT DOCUMENTS

| | | |
|---|---|---|
| CN | 110780894 A | 2/2020 |
| CN | 110784360 A | 2/2020 |
| WO | 2012142854 A1 | 10/2012 |

OTHER PUBLICATIONS

"Knative Eventing Sequence", Knative, <https://knative.dev/docs/eventing/samples/sequence/sequence-terminal/>, retrieved Aug. 4, 2020, 5 pages.

(Continued)

*Primary Examiner* — John Q Chavis
(74) *Attorney, Agent, or Firm* — David B. Woycechowsky

(57) ABSTRACT

Approaches presented herein enable hot upgrading a microservices sequence in a cloud computing environment. More specifically, a next microservice of microservice subsequence in a running sequence is obtained, in response to a message to invoke the microservice or subsequence. The running microservice sequence includes at least one unexecuted microservice or subsequence that is to be hot upgraded. The running microservice sequence is generated based on a sequence that is to be hot upgraded which comprises an ordered list of microservices and/or subsequences. The approach may include determining the status of a next microservice or subsequence. The approach may further include invoking the next microservice or subsequence in the running sequence, in response to the status of the next microservice or subsequence being upgrade-complete.

8 Claims, 10 Drawing Sheets

(56) References Cited

U.S. PATENT DOCUMENTS

2018/0074842 A1* 3/2018 Fu .................. G06F 9/45545
2019/0138297 A1* 5/2019 Wu .................. G06F 16/958

OTHER PUBLICATIONS

"Knative Eventing", Knative, <https://knative.dev/docs/eventing/>, Apr. 27, 2020, 5 pages.

"MicroSoft Azure Duration Functions", Microsoft, <https://docs.microsoft.com/en-us/azure/azure-functions/durable/durable-functions-versions>, Oct. 30, 2019, 5 pages.

"Open Source project—Apache OpenWhisk—Action sequence", github, apache/openwhisk, <https://github.com/apache/openwhisk/blob/master/docs/actions.md#creating-action-sequences>, Jul. 31, 2020, 3 pages.

"Snapshot and process instance migration", IBM Knowledge Center, <https://www.ibm.com/support/knowledgecenter/en/SS8JB4_20.x/com.ibm.wbpm.admin.doc/topics/csnapshotandprocessmig.html>, retrieved Aug. 4, 2020, 2 pages.

Lehota, Ondrej, "Automate the deployment of pod dependencies in Kubernetes", IBM Developer, <https://developer.ibm.com/technologies/containers/articles/automating-deployment-pod-dependencies-in-kubernetes/>, Published Jul. 2, 2019, 11 pages.

Mell et al., "The NIST Definition of Cloud Computing", NIST, National Institute of Standards and Technology, Special Publication 800-145, Sep. 2011, 7 pages.

* cited by examiner

```
kind: Sequence
metadata:
   name: sequenceX
spec:
steps:
   - ref:
      Kind: Service
      name: A
   - ref:
      Kind: Service
      name: B
   - ref:
      Kind: Sequence
      name: SequenceY
```

FIG. 6a

```
kind: Sequence
metadata:
   name: sequenceY
spec:
steps:
   - ref:
      Kind: Service
      name: D
   - ref:
      Kind: Service
      name: E
   - ref:
      Kind: Service
      name: F
```

FIG. 6b

```
---
kind: Service
metadata:
  name: B
spec:
  template:
    spec:
       containers:
         - image: XXX
---
kind: Service
metadata:
   name: D
spec:
  template:
    spec:
       containers:
         - image: XXX
```

FIG. 6c

```
---
kind: Sequence
metadata:
    name: sequenceX
spec:
    version: v1
    steps:
    - ref:
        kind: Service
        name: A
        version: v1
    - ref:
        kind: Service
        name: B
        version: v1
    - ref:
        kind: Sequence
        name: sequenceY
        version: v1
```

FIG. 8a

```
---
kind: Sequence
metadata:
    name: sequenceY
spec:
    version: v1
    steps:
    - ref:
        kind: Service
        name: D
        version: v1
    - ref:
        kind: Service
        name: E
        version: v1
    - ref:
        kind: Service
        name: F
        version: v1
```

FIG. 8b

```
---
kind: Service
metadata:
    name: B
    labels:
        version: v1
spec:
    template:
        spec:
            containers:
            - image: XXX:v1
---
kind: Service
metadata:
    name: D
    labels:
        version: v1
spec:
    template:
        spec:
            containers:
            - image: XXX:v1
```

FIG. 8c

```
---
kind: Sequence
metadata:
    name: sequenceX
spec:
    version: v2
    upgrade: migrated
    steps:
        - ref:
            kind: Service
            name: A
            version: v1
        - ref:
            kind: Service
            name: B
            version: v2
            upgrade: migrated
        - ref:
            kind: Sequence
            name: sequenceY
            version: v2
            upgrade: migrated
```

FIG. 8d

```
---
kind: Sequence
metadata:
    name: sequenceY
spec:
    version: v2
    upgrade: migrated
    steps:
        - ref:
            kind: Service
            name: D
            version: v2
            upgrade: migrated
        - ref:
            kind: Service
            name: E
            version: v1
        - ref:
            kind: Service
            name: F
            version: v1
```

FIG. 8e

```
---
kind: Service
metadata:
    name: B
    labels:
        version: v2
spec:
    template:
        spec:
            containers:
                - image: XXX:v2
---
kind: Service
metadata:
    name: D
    labels:
        version: v2
spec:
    template:
        spec:
            containers:
                - image: XXX:v2
```

FIG. 8f

UPGRADING A SEQUENCE OF MICROSERVICES IN A CLOUD COMPUTING ENVIRONMENT

TECHNICAL FIELD

The present invention relates generally to cloud computing and, more specifically, to hot upgrading a sequence of microservices in a cloud computing environment.

BACKGROUND

Cloud computing is used by a number of enterprises to deploy and host software applications. In a cloud computing environment, functionalities of applications may be decoupled, and containerized or wrapped as microservices. A sequence of microservices provides an approach to define an ordered list of microservices or subsequences of microservices. A sequence can be invoked to perform a computing software solution.

SUMMARY

Approaches presented herein enable hot upgrading a microservices sequence in a cloud computing environment. More specifically, a next microservice of microservice subsequence in a running sequence is obtained, in response to a message to invoke the microservice or subsequence. The running microservice sequence includes at least one unexecuted microservice or subsequence that is to be hot upgraded. The running microservice sequence is generated based on a sequence that is to be hot upgraded which comprises an ordered list of microservices and/or subsequences. The approach may include determining the status of a next microservice or subsequence. The approach may further include invoking the next microservice or subsequence in the running sequence, in response to the status of the next microservice or subsequence being upgrade-complete.

One aspect of the present invention includes a computer-implemented method for upgrading a sequence of microservices, comprising: responsive to a message to invoke a next microservice or subsequence, obtaining, by one or more processors, the next microservice or subsequence in a running sequence instance, wherein the running sequence instance comprises at least one unexecuted microservice or subsequence to be hot upgraded, and wherein the running sequence instance is generated based on a sequence to be hot upgraded comprising an ordered list of a plurality of microservices or subsequences, determining, by the one or more processors, a status of the next microservice or subsequence in the running sequence instance, and responsive to the status of the next microservice or subsequence being upgrade-complete, invoking, by the one or more processors, the next microservice or subsequence in the running sequence instance.

Another aspect of the present invention includes a computer system for upgrading a sequence of microservices, comprising: a processing unit, and a memory coupled to the processing unit and storing instructions thereon, the instructions, when executed by the processing unit, performing actions including: responsive to a message to invoke a next microservice or subsequence, obtaining the next microservice or subsequence in a running sequence instance, wherein the running sequence instance comprises at least one unexecuted microservice or subsequence to be hot upgraded, and wherein the running sequence instance is generated based on a sequence to be hot upgraded comprising an ordered list of a plurality of microservices or subsequences, determining a status of the next microservice or subsequence in the running sequence instance, and responsive to the status of the next microservice or subsequence being upgrade-complete, invoking the next microservice or subsequence in the running sequence instance.

Yet another aspect of the present invention includes a computer program product for upgrading a sequence of microservices, comprising a computer-readable storage medium having program instructions embodied therewith, the program instructions executable by a processor to cause the processor to perform actions including: responsive to a message to invoke a next microservice or subsequence, obtaining the next microservice or subsequence in a running sequence instance, wherein the running sequence instance comprises at least one unexecuted microservice or subsequence to be hot upgraded, and wherein the running sequence instance is generated based on a sequence to be hot upgraded comprising an ordered list of a plurality of microservices subsequences, determining a status of the next microservice or subsequence in the running sequence instance, and responsive to the status of the next microservice or subsequence being upgrade-complete, invoking the next microservice or subsequence in the running sequence instance.

Still yet, any of the components of the present invention could be deployed, managed, serviced, etc., by a service provider who offers to implement upgrading a sequence of microservices in a computer system.

Embodiments of the present invention also provide related systems, methods, and/or program products.

BRIEF DESCRIPTION OF THE DRAWINGS

These and other features of this invention will be more readily understood from the following detailed description of the various aspects of the invention taken in conjunction with the accompanying drawings in which:

FIGS. 6a-6c depict microservices sequence definition files according to an embodiment of the present disclosure.

FIGS. 8a-8c depict proposed microservices sequence definition files according to an embodiment of the present disclosure.

FIGS. 8d-8f depict proposed microservices sequence definition files that are to be hot upgraded according to an embodiment of the present disclosure.

Figure 1:
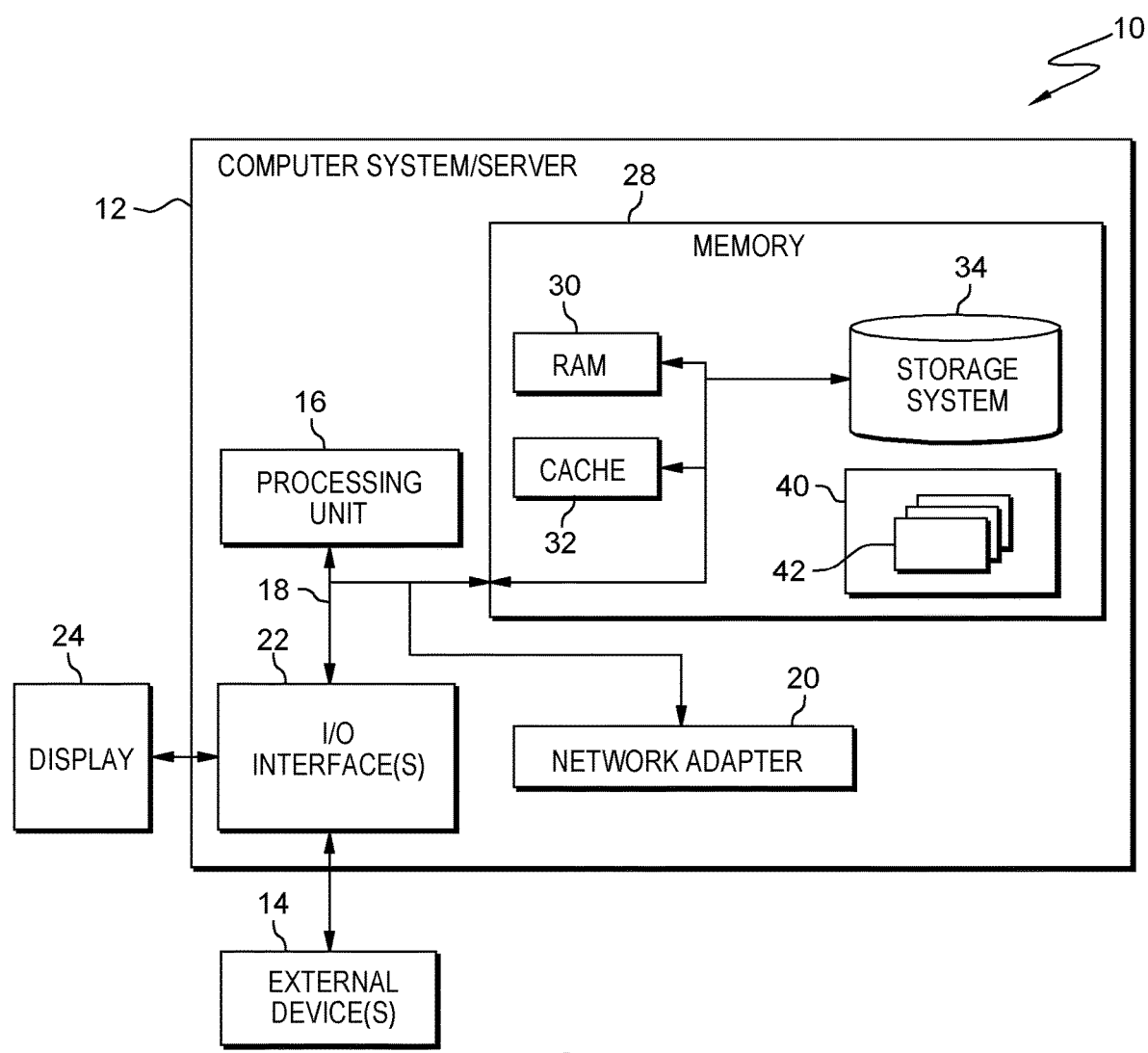
FIG. 1 depicts a cloud computing node according to an embodiment of the present disclosure.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
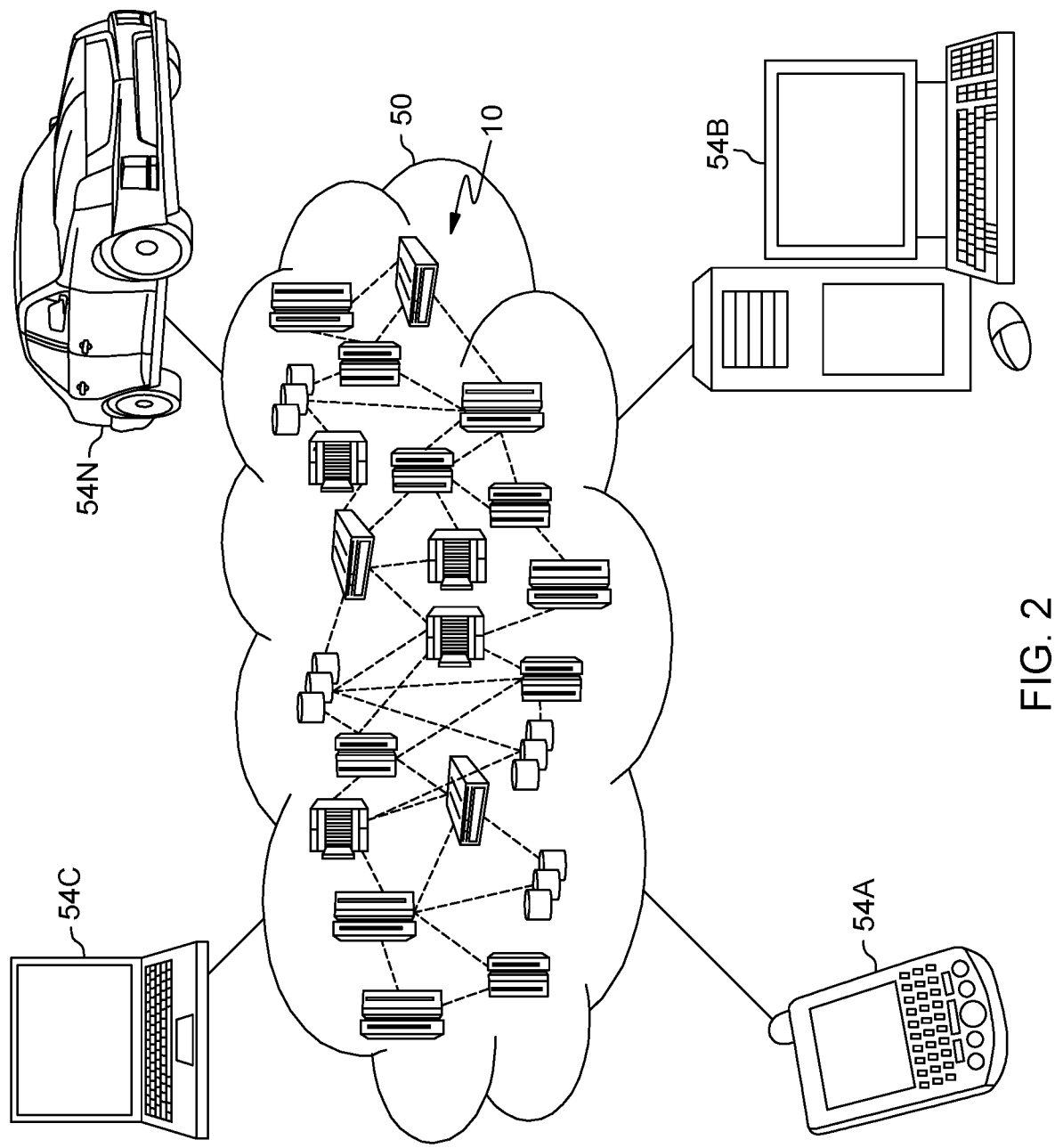
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
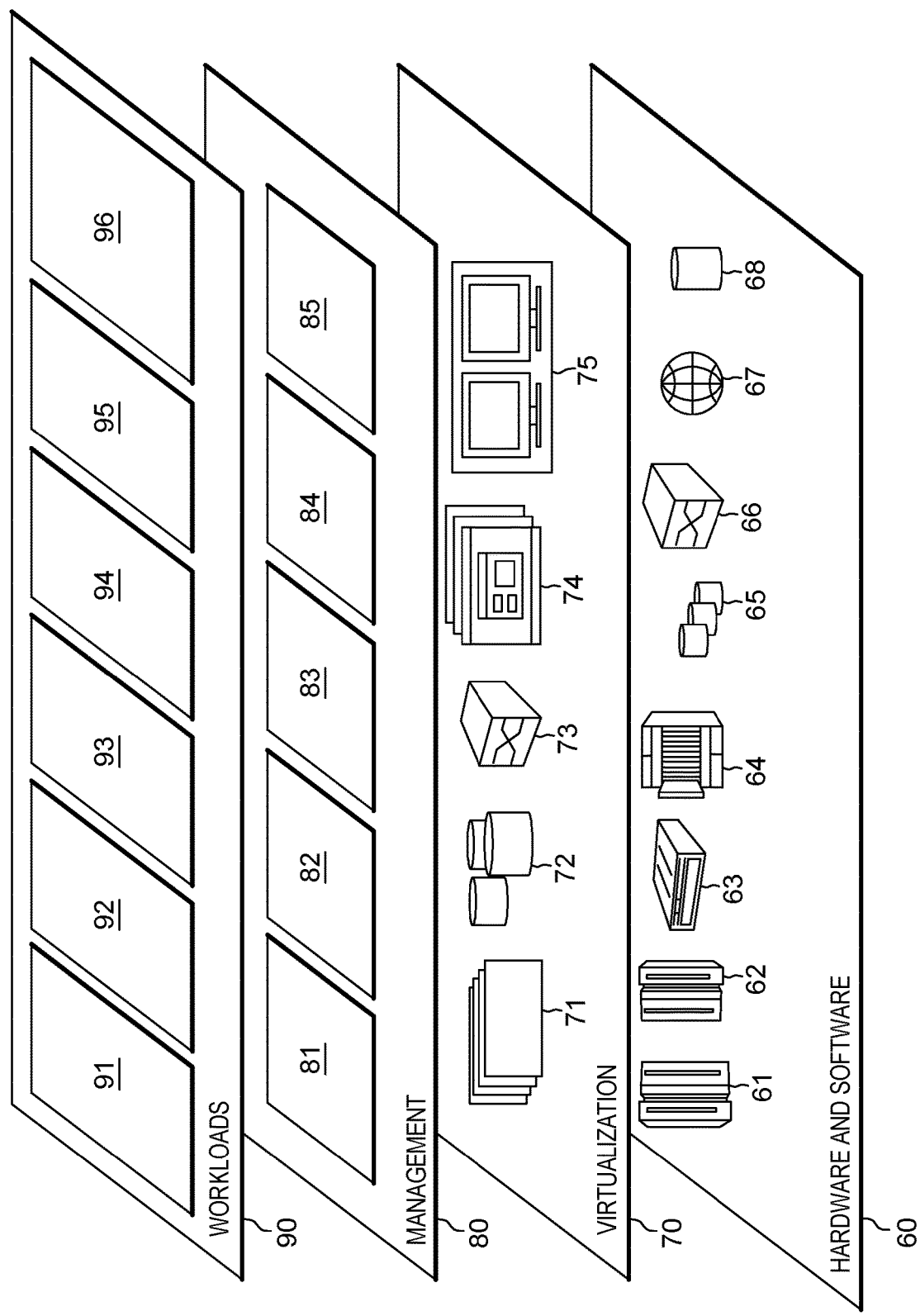
FIG. 3 depicts abstraction model layers according to an embodiment of the present disclosure.

Referring now to FIG. 3, a set of functional abstraction layers provided by cloud computing environment 50 (FIG.

2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and sequence hot upgrading 96.

As mentioned above, a sequence can be used to process a business process in solutions since it provides a way to define an ordered list of microservices and/or subsequences that can be invoked, such as Knative Eventing on Kubernetes, etc. In existing cloud computing environments, microservices can be hot upgraded, which makes a sequence comprising the microservices also hot upgraded as well. However, the current sequence processing unit in the existing cloud computing environments cannot support the function of a hot upgrade of a sequence.

Figure 4A:
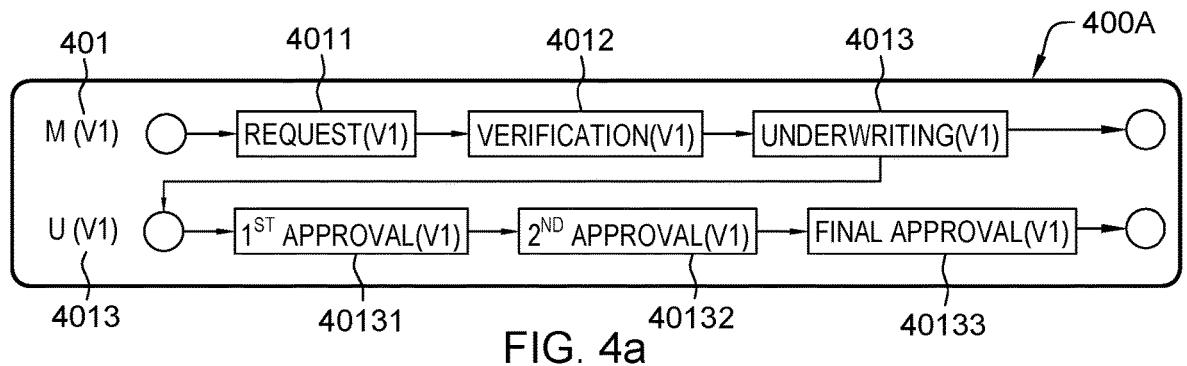
FIGS. 4a-4d depict a business process and a hot upgrade thereof according to an embodiment of the present disclosure.
Figure 4B:
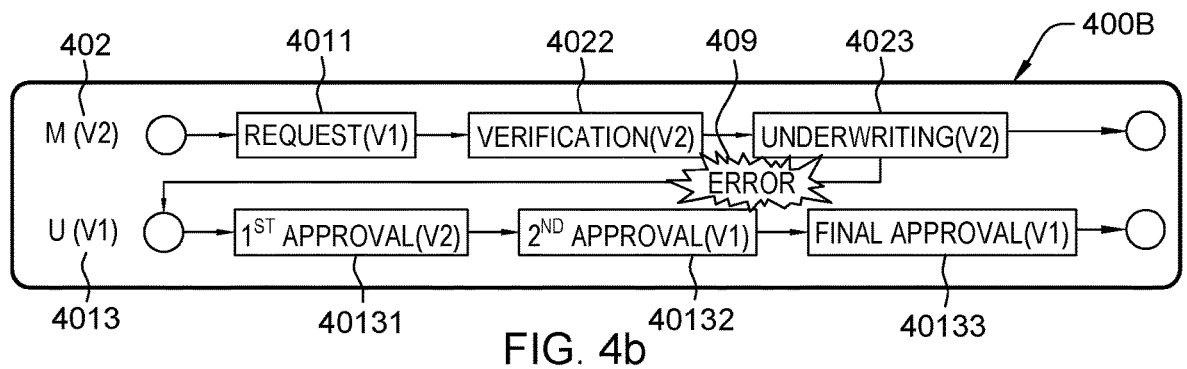
Figure 4C:
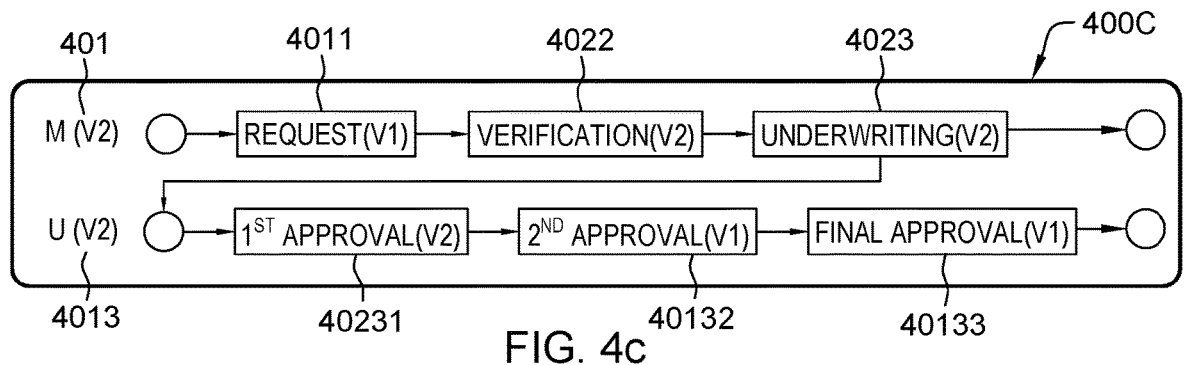

FIG. 4a depicts an existing exemplary business process 400A comprising a sequence Mortgate (Version 1.0, abbreviated as V1 hereafter) 401. The sequence Mortgate (V1) 401 defines three ordered microservices/subsequence, namely, a microservice Request (V1) 4011, a microservice Verification (V1) 4012, and a subsequence Underwriting (V1) 4013. The subsequence Underwriting (V1) 4013 also defines three ordered microservices, namely, a microservice 1st Approval (V1) 40131, a microservice 2nd Approval (V1) 40132 and a microservice Final Approval (V1) 40133. FIG. 4c depicts a hot upgraded process 400C of the business process 400A. As shown in FIG. 4c, when the microservice Verification (V1) 4012 and the microservice 1st Approval (V1) 40131 have been hot upgraded into the microservice Verification (V2) 4022 and the microservice 1st Approval (V2) 40231, the business process 400A may change to process 400C, where the sequence Mortgate (V1) 401 and the subsequence Underwriting (V1) 4013 should be hot upgraded to the sequence Mortgate (V2) 402, and the subsequence Underwriting (V2) 4023 respectively.

As indicated before, the current cloud computing environments cannot support the function of a hot upgrade of a sequence. In other words, if a sequence is forcibly hot upgraded in the current cloud computing environments, the instance of the sequence will go wrong. The sequence Mortgate (V1) 401 and the subsequence Underwriting (V1) 4013 have to be stopped so as to be hot upgraded to the sequence Mortgate (V2) 402 and the subsequence Underwriting (V2) 4023. FIG. 4b depicts a hot upgrading process 400B of the business process 400A. As shown in FIG. 4b, if the sequence Underwriting (V1) 4013 does not stop, all running sequence instances may meet error 409 during the hot upgrade indicated by business process 400B.

Figure 4D:
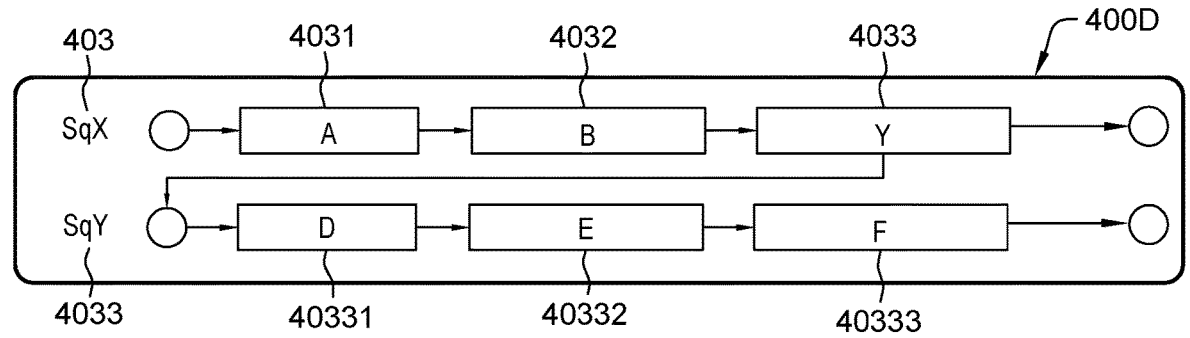

As shown in FIG. 4d, an process 400 is used to abstract the above business process 400A/400B/400C, a Sequence X 403 and Subsequence Y 4033 are used to represent the above sequence Mortgate and subsequence Underwriting respectively, and microservices A, B, D, E, F are used to represent the above microservices Request, Verification, 1st Approval, 2nd Approval and Final Approval respectively. The process 400 will be used to illustrate the present invention as an example.

Figure 5:
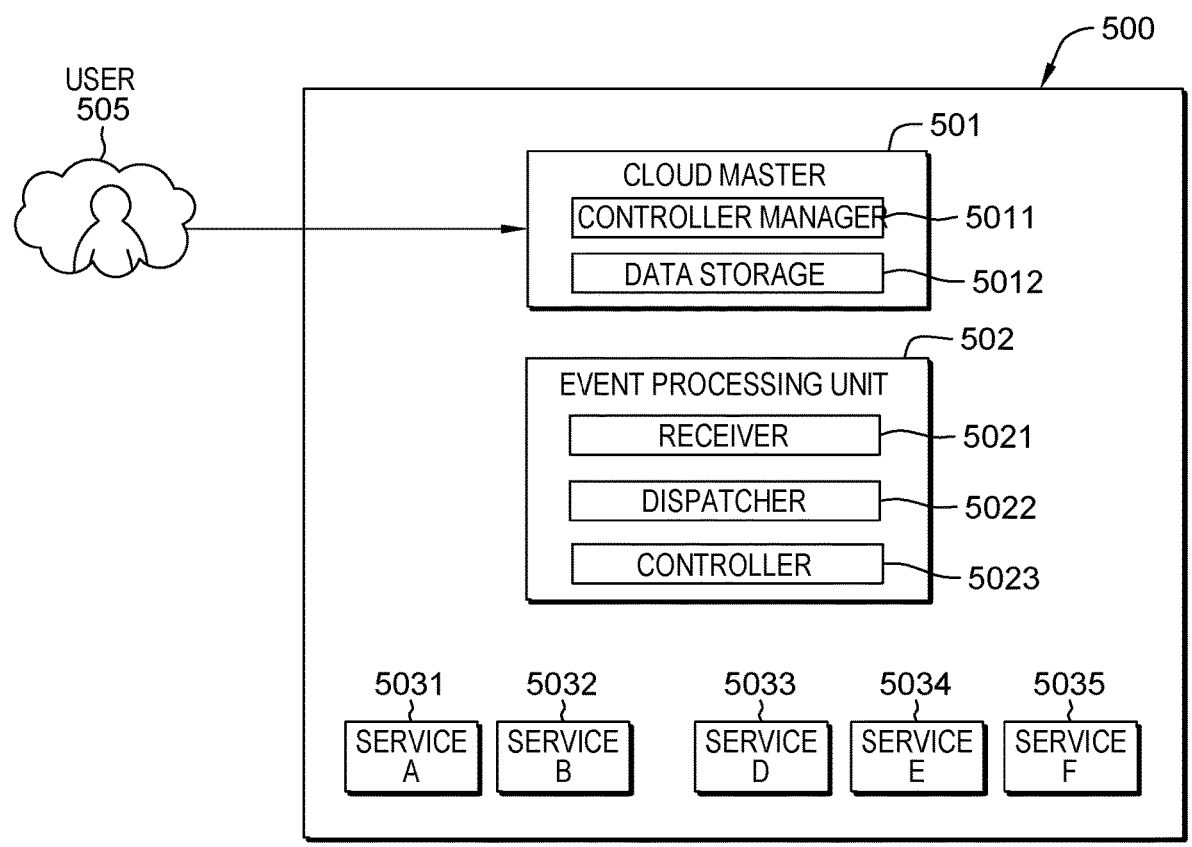
FIG. 5 depicts a cloud computing environment for processing a microservices sequence according to an embodiment of the present disclosure.

FIG. 5 depicts a schematic diagram of an existing exemplary cloud computing environment 500 for processing a sequence, the cloud computing environment 500 comprising a cloud master 501, an event processing unit 502 and a plurality of deployed microservices such as a microservice A 5031, a microservice B 5032, a microservice D 5033, a microservice E 5034 and a microservice F 5035 representing respectively the microservices A, B, D, E, F of the above process 400 shown in FIG. 4. The cloud master 501 comprises a controller manager 5011 and a data storage 5012. The event processing unit 702 comprises a receiver 5021, a dispatcher 5022 and a controller 5023.

A user 505 may edit the process 400 as the Sequence X 403 in a definition file and send a request to the cloud computing environment 500 for inputting the definition file into the data storage 5012. FIG. 6a depicts an exemplary definition of the Sequence X 403 comprising the microservice A 5031, the microservice B 5032 and the Subsequence Y 4033. FIG. 6b depicts an exemplary definition of the Subsequence Y 4033 comprising the microservice D 5033, the microservice E 5034 and the microservice F 5035. FIG. 6c depicts an exemplary definition of microservices, in which only two microservices are shown for sake of brevity. The three definitions shown in FIG. 6a, 6b and 6c compose collectively the exemplary definition file of the Sequence X 403. Those skilled in the art may be appreciated that the exemplary definition file of the Sequence X 403 shown in FIGS. 6a, 6b and 6c is provided for illustration purpose without implying any limitation, other data structure or file type can used alternatively.

When receiving the request for inputting the definition file into the data storage 5012, the controller manager 5011 may notify the controller 5023 to input the definition file of the Sequence X 403 into the data storage 5012. The controller 5023 may then parse the definition file of the Sequence X 403, and can use data structure required by the data storage 5012 to input information corresponding to the definition file of the Sequence X 403 into the data storage 5012, which stores all data processed by the cloud computing environment 500. Table 1 shows information of the exemplary definition file of the Sequence X 403 comprising an ordered list of a plurality of microservices and/or subsequences, which use a table structure required by the data storage 5012. It should be understood that the data structure shown in Table 1 is provided for illustrative purpose without implying any limitation, and other data structure can also be applied.

TABLE 1

| Sequence name | Service | Next Service |
|---|---|---|
| X | A | B |
|   | B | Y |
|   | Y |   |
| Y | D | E |
|   | E | F |
|   | F |   |

After inputting the information of the definition file of the Sequence X 403 402 into the data storage 5012, the controller 5023 may generate a sequence instance based on the definition file of the Sequence X 403 when a request to invoke the Sequence X 403 is received. Then the receiver and dispatcher can invoke each microservice or subsequence together according to the sequence definition to execute the sequence instance. For example, for a sequence instance, the receiver 5021 may receive a message that is an output of an original microservice and an input of a next microservice, and obtain the next microservice or subsequence from the definition of sequence and enable the dispatcher 5022 by sending a message to the dispatcher 5022 to invoke the next microservice or subsequence.

It can be found that the existing cloud computing environment 500 cannot support a hot upgrade of the sequence.

Figure 7:
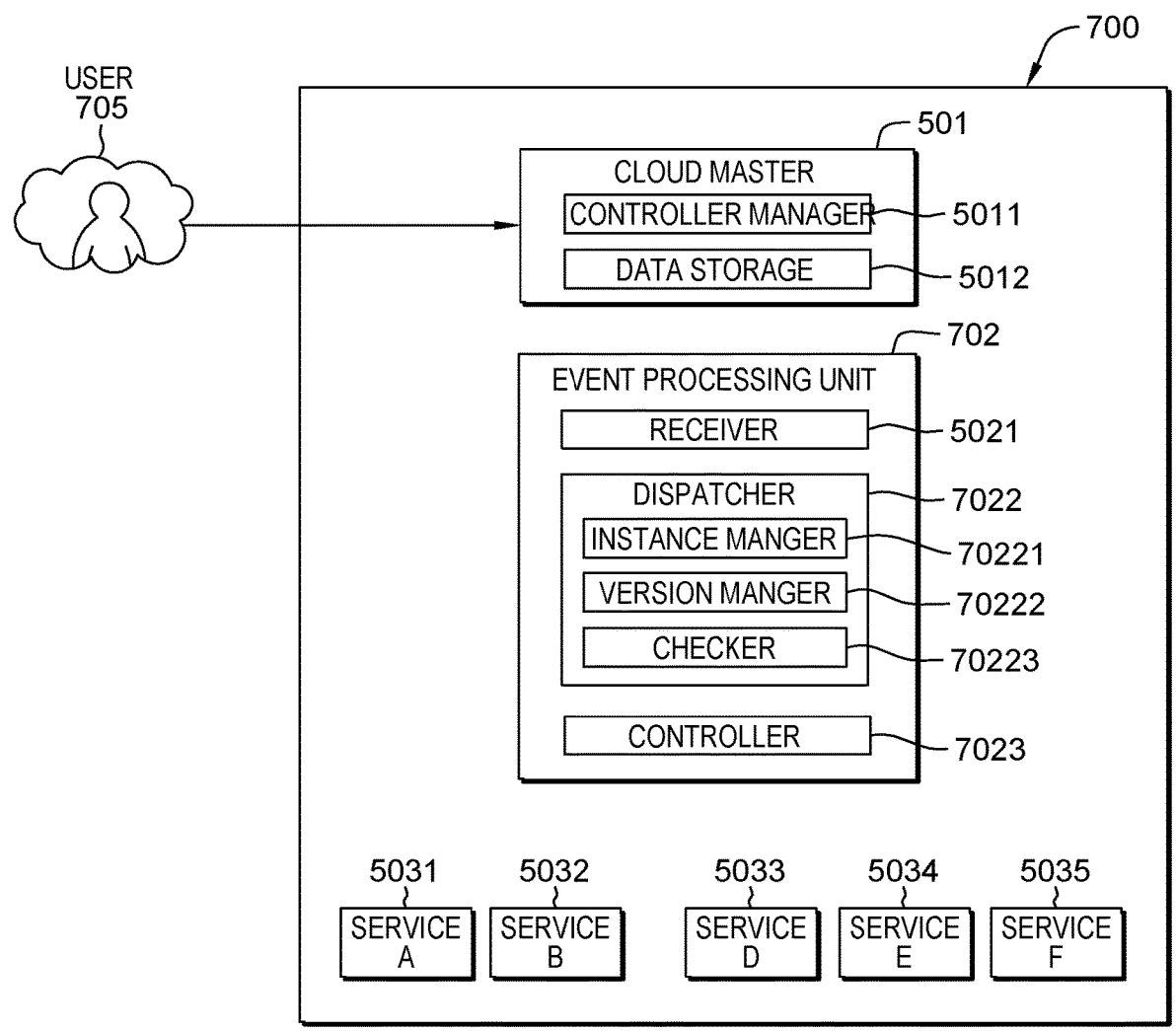
FIG. 7 depicts a cloud computing environment for performing a hot upgrade of a microservices sequence according to an embodiment of the present disclosure.

FIG. 7 depicts a schematic diagram of a proposed exemplary cloud computing environment 700 for a hot upgrade of a sequence according to some embodiments of the present disclosure. It is noted that like and corresponding components in both FIG. 5 and FIG. 7 are referred to by like reference numerals, and in both FIG. 5 and FIG. 7, two components having the same component name but different reference numerals also represent the same component, but the component is improved in FIG. 7 compared to the component in FIG. 5. Now referring to FIG. 7, the proposed exemplary cloud computing environment 700 may comprise a cloud master 501, an event processing unit 702 and a plurality of deployed microservices such as, same to FIG. 5, the microservice A 5031, the microservice B 5032, the microservice D 5033, the microservice E 5034 and a microservice F 5035 for the above process 400. The cloud master 501 comprises the controller manager 5011 and the data storage 5012, same to FIG. 5. The event processing unit 702 comprises the receiver 5021, a dispatcher 7022 and a controller 7023. The dispatcher 7022 comprises an instance manager 70221, a version manager 70222 and a checker 70223. The proposed cloud computing environment 700 can support a hot upgrade of a sequences and the details will be describe below using the Sequence X 403 of FIG. 4c as an example. The same components in both FIG. 5 and FIG. 7 have the same function. As known by those skilled in the art, the components in FIG. 7 are connected with each other by a communication network.

The communication network in FIG. 7 may include various types of communication networks, such as a wide area network (WAN), local area network (LAN), a telecommunication network, a wireless network, a public switched network and/or a satellite network. The communication network may include connections, such as wire, wireless communication links, or fiber optic cables.

Each component in the cloud computing environment 700 may be, for example, a mobile device, a telephone, a personal digital assistant, a netbook, a laptop computer, a tablet computer, a desktop computer, or any type of computing device capable of running a program and accessing a network. The cloud computing environment 700 may operate in a cloud computing service model, such as Software as a Service (SaaS), Platform as a Service (PaaS), or Infrastructure as a Service (IaaS). The cloud computing environment 700 may also be located in a cloud computing deployment model, such as a private cloud, community cloud, public cloud, or hybrid cloud.

A user 505 may edit the Sequence X 403 in a definition file supporting both sequence version and microservice version and may request the cloud computing environment 700 to input the definition file into the data storage 5012. FIG. 8a depicts a proposed exemplary definition of the Sequence X 403 according to some embodiments of the present disclosure, which supports both sequence version and microservice version (indicated by the underline words), and comprises the microservice A (V1), the microservice B (V1) and Subsequence Y (V1). FIG. 8b depicts a proposed exemplary definition of Subsequence Y according to some embodiments of the present disclosure, which supports both sequence version and microservice version (indicated by the underline words) and comprises the microservice D (V1), the microservice E (V1) and the microservice F (V1). FIG. 8c depicts a proposed exemplary definition of microservices supporting microservice version (indicated by the underline words), in which only the microservice B and the microservice D are shown as examples for sake of brevity. The three definitions shown in FIGS. 8a, 8b and 8c compose collectively the improved definition file of the Sequence X 403. Those skilled in the art can understand that FIGS. 8a, 8b and 8c are just shown a proposed exemplary definition file of the Sequence X 403 without suggesting any limitation, other data structure or file type can used alternatively.

When receiving the request for input the definition file into the data storage 5012, the controller manager 5011 may notify the controller 7023 to input the improved definition file of the Sequence X 403 into the data storage 5012. The controller 7023 may parse the improved definition file of the Sequence X 403 and can use data structure required by the data storage 5012 to input information corresponding to the definition file of the Sequence X 403 into the data storage 5012. Table 2 shows information of the exemplary improved definition file of the Sequence X 403, which use a table structure required by the data storage 5012. Compared with the information shown in FIG. 5, both the sequence version and the microservice version are included in the improved definition file of the Sequence X 403. It should be understood that the data structure shown in Table 2 is provided for illustrative purpose without implying any limitation, and other data structure can also be applied.

TABLE 2

| Sequence name | Sequence version | Service | Service version | Next Service |
|---|---|---|---|---|
| X | V1 | A | V1 | B |
|   |    | B | V1 | Y |
|   |    | Y | V1 |   |
| Y | V1 | D | V1 | E |
|   |    | E | V1 | F |
|   |    | F | V1 |   |

After inputting the information of the improved definition file of the Sequence X 403 into the data storage 5012, the controller 7023 may generate a sequence instance based on the improved definition file of the Sequence X 403 when a request to invoke the Sequence X 403 is received. Then the receiver and dispatcher can invoke each microservice or subsequence together according to the sequence definition to execute the sequence instance. For example, for a sequence instance, the receiver 5021 may receive a message that is an output of an original microservice and an input of a next microservice, and obtain the next microservice or subsequence from the definition of sequence and enable the dispatcher 7022 to invoke the next microservice or subsequence.

With a plurality of requests for invoking the Sequence X 403 are received, a plurality of sequence instances may be optionally generated by the controller 7023. The information of the plurality of sequence instances comprising such as Sequence instance ID, Sequence Name, Current running service and status of sequence instance may be obtained by the instance manager 70221 and input into the data storage 5012. Table 3 shows exemplary information of the plurality of sequence instances in the data storage 5012. It should be understood that above Table 3 data structure is just for illustrative purpose without implying any limitation, and other data structure can also be applied.

TABLE 3

| Sequence instance ID | Sequence Name | Current running service | Status of sequence instance |
|---|---|---|---|
| Sequence_instance_1 | X | Y | Stop |
| Sequence_instance_2 | X | B | Running |
| Sequence_instance_3 | X | A | Running |
| . . . | . . . | . . . | . . . |

In some cases, the user 505 may need a hot upgrade of the Sequence X 403 and the Subsequence Y 4033 in which hot upgrades of microservice B 5032 (or 4032) and microservice D 5033 (or 40331) would be applied. Thus, the user may edit an upgraded definition file which supports sequence version, microservice version and upgraded policy for both microservices and sequences and may request the cloud computing environment 700 to execute the upgrading definition file by sending a command for hot upgrading a sequence, such as the command can be defined as "$ kubectl apply -f upgrade.yaml" for Knative Eventing in Kubernetes, in which the upgraded definition file is named as upgrade.yaml.

There are two kinds of hot upgraded policy for both a microservice and a subsequence comprised in a sequence to be hot upgraded. One hot upgraded policy for a microservice is "reserved" which means the message for the microservice should be still sent to the microservice of current version as there is no version update. It can be found that the microservice comprised in the sequence with the policy of "reserved" does not need to be hot upgraded. Another hot upgraded policy for a microservice is "migrated" which means the message for the microservice should be sent to the microservice of new version. It can be found that the microservice comprised in the sequence with the policy of "migrated" needs to be hot upgraded.

In addition, hot upgraded policy "reserved" for a subsequence means that a subsequence running in current version will continue to run in the current version. It can be found that the subsequence comprised in the sequence with the policy of "reserved" does not need to be hot upgraded. Another hot upgrade policy for a subsequence is "migrated", which means that a subsequence running in current version should move to new version for a related running sequence instance. It can be found that the subsequence comprised in the sequence with the policy of "migrated" needs to be hot upgraded. It should be note that the "reserved" policy is a first kind of policy, and the "migrated" policy is a second kind of policy, the words "reserved" and "migrated" are for illustrative purpose, those skilled in the art can use other words or number to represent the two kinds of policy.

FIG. 8d shows an proposed exemplary definition of Sequence X 403 to be hot upgraded according to some embodiments of the present disclosure, which supports sequence version, microservice version and hot upgraded policy (indicated by the underline words) and comprises the microservice A (V1), the microservice B (V2) and Subsequence Y (V2). It can be found that the upgraded policy for the Sequence X 403 is "migrated" since the Sequence X 403 includes the microservice B and the Subsequence Y, both of which need to be hot upgraded. The upgraded policy for the microservice A (V1) is "reserved", which means the microservice A (V1) does not need to be hot upgraded. Here the policy "reserved" is omitted in the definition file of sequence. Those skilled in the art may understand the policy "reserved" can also be written in the description shown in FIG. 8d. The hot upgraded policy for the microservice B (V2) is "migrated" since the microservice B needs to be hot upgraded from V1 to V2, then messages for the microservice B (V1) need to be sent to the microservice B (V2) for any running sequences later. The upgraded policy for the Subsequence Y is "migrated", which will be explained in detail in FIG. 8e.

FIG. 8e depicts an exemplary definition of Subsequence Y, which needs to be hot upgraded according to some embodiments of the present disclosure, which supports sequence version, microservice version and hot upgraded policy (indicated by the underline words) and comprises the microservice D (V2), the microservice E (V1) and the microservice F (V1). It can be found that the upgraded policy for the Subsequence Y is "migrated" since the Subsequence Y includes the microservice D, which needs to be hot upgraded. The upgraded policy for the microservice D is "migrated" since the microservice D needs to be hot upgraded from V1 to V2, then the message for the microservice D (V1) need to be sent to the microservice D (V2) for any running sequences later. The upgraded policy for both the microservices D (V1) and E (V1) is "reserved", which means both the microservices D (V1) and E (V1) do not need to be hot upgraded. Here still the policy "reserved" is omitted in the definition file of the sequence. Those skilled in the art may understand the policy "reserved" can also be written in the description shown in FIG. 8e. FIG. 8f depicts exemplary definition of microservices according to some embodiments of the present disclosure, which supports microservice version and upgraded policy (indicated by the underline words). Here only the microservice B and the microservice D are shown in FIG. 8f as examples for sake of brevity. The three upgrading definitions shown in FIGS. 8d, 8e and 8f compose collectively the upgraded definition file of the Sequence X 403, e.g. the file of upgrade.yaml mentioned before. Those skilled in the art will be appreciated that FIGS. 8d, 8e and 8f are just shown an exemplary upgraded definition file of the Sequence X without implying and limitation, and other data structure or file type can be used alternatively. Those skilled in the art may understand that FIGS. 8d, 8e and 8f which using hot upgrade policy are one implementation to determine a status of a next microservice or subsequence in a running sequence instance in the following description. Other kind of definition can be used too.

When the command for hot upgrading a sequence is received in the cloud computing environment 700, the controller manager 7011 may notify the controller 7023 to input the hot upgrading definition file of the Sequence X 403. The controller 7023 may parse the hot upgrading definition file (e.g. the file of upgrade.yaml comprised in the command) for the Sequence X 403 and input information of the hot upgrading definition of the Sequence X 403 in the data storage 5012. Table 4 shows exemplary information of the hot upgrading definition file of the Sequence X 403. Compared with the information shown in FIG. 2, it can be found that sequence version of the Subsequence Y is to be updated from V1 to V2, versions for the microservices B and D are to be updated from V1 to V2, and upgraded policy for the Subsequence Y and the microservices B and D are included in Table 4. It should be understood that above Table 4 data structure is just for illustrative purpose without implying any limitation, and other data structure can also be applied.

TABLE 4

| Sequence name | Sequence version | Service | Service version | Next Service | Upgraded policy |
|---|---|---|---|---|---|
| X | V1 | A | V1 | B | reserved |
|  |  | B | V1 | Y | migrated |
|  |  | Y | V1 |  | migrated |
| Y | V1 | D | V1 | E | migrated |
|  |  | E | V1 | F | reserved |
|  |  | F | V1 |  | reserved |

After the controller 7023 inputs the hot upgraded definition of the Sequence X 403 into the data storage 7012, the instance manager 70221 may obtain at least one running sequence instance comprising at least one unexecuted microservices/subsequences to be hot upgraded (that is the at least one unexecuted microservices/subsequences with the hot upgraded policy "migrated") from the plurality of sequence instances generated (such as Table 3) in the data storage 7012. It can be found that the query result for Table 3 is shown in Table 5 as the unexecuted Subsequence Y in the running Sequence_instance_2 has the hot upgraded policy "migrated" and both the unexecuted microservice B and the unexecuted Subsequence Y in the running Sequence_instance_2 have the hot upgraded policy "migrated".

TABLE 5

| Sequence instance ID | Sequence Name | Current running service | Status |
|---|---|---|---|
| Sequence_instance_2 | X | B | Running |
| Sequence_instance_3 | X | A | Running |

In some embodiments, the instance manager 70221 may obtain the at least one running sequence instance comprising at least one of unexecuted microservices/subsequences to be hot upgraded (that is the at least one of unexecuted microservices/subsequences with the hot upgraded policy "migrated") shown in FIG. 5 directly instead of query the results from the Table 2 in the data storage 5012. In other words, the information in Table 2 in the data storage 5012 is optional.

In some embodiments, in response to a message to invoke the next microservice or subsequence in a running sequence instance from the receiver 5021, the checker 70223 may determine whether the running sequence instance comprises at least one unexecuted microservices/subsequences to be hot upgraded. In some embodiments, the determination can be done by checking whether the running sequence instance is included in the Table 5. In some embodiments, the determination can be done by tracking the definition of the sequence directly. If the checker 70223 determines that the running sequence instance comprises at least one unexecuted microservices/subsequences to be hot upgraded, the checker 70223 may get the running service currently being invoked from such as Table 5 and then obtain the next microservice/sequence from the hot upgrading definition of the Sequence X 403 comprising the ordered list of a plurality of microservices and/or subsequences shown in FIG. 4 in the data storage 5012. Then checker may check whether the status of the next microservice/sequence is "upgrade-complete".

In some embodiments, if a microservice does not to be hot upgraded, namely, the upgraded policy of a microservice is "reserved", the status of the microservice is determined to be "upgrade-complete". That is, the microservice doesn't need to be updated and it can be invoked continuedly. And if a microservice needs to be hot upgraded, namely, the upgraded policy of a microservice is "migrated", and if a current version of the microservice is different from a required version, the status of the microservice is determined to be "upgrade-incomplete"; while if the current version of the microservice is the same as the required version, the status of the microservice is determined to be "upgrade-complete". That is, the microservice has not been hot upgraded to the required version, it cannot be invoked (e.g., the status is "upgrade-incomplete"), but if it has been hot upgraded to the required version, it can be invoked (e.g., the status is "upgrade-complete") directly.

In some embodiments, if a subsequence does not need to be hot upgraded, namely, the upgraded policy of a sequence is "reserved", the status of the sequence is determined to be "upgrade-complete". That is, the subsequences included in the sequence of current version has been deployed and they can be invoked continuedly. And if a subsequence needs to be hot upgraded, namely, the upgraded policy of a sequence is "migrated", there are two solutions. One solution is: a current version of the subsequence is the same as a required version, the status of the microservice or subsequence is determined to be "upgrade-complete"; while if the current version of the subsequence is different from the required version, the status of the subsequence is determined to be "upgrade-incomplete". That is, each status of all microservices included in the subsequence have contribution to the status of the subsequence. Another solution is: if a current version of the subsequence is the same as a required version, the status of the subsequence is determined to be "upgrade-complete"; the current version of the subsequence is different from the required version, and a current version of a first microservice in the subsequence is the same as a required version, the status of the subsequence is determined to be "upgrade-complete"; and if the current version of the subsequence is different from the required version, and the current version of a first microservice in the subsequence is different from the required version, the status of the subsequence is determined to be "upgrade-incomplete". That is, only status of the first microservice among all microservices included in the subsequence has contribution to the status of the subsequence.

In some embodiments, the version manager 70222 may check the current version of a microservice/subsequence deployed in the cloud computing environment at any time, and obtain information of the current version, a required version, hot upgraded policy, status for each microservice/sequence included in the upgraded Sequence X, shown as Table 6, from the information in such as Table 4 and Table 5 and input the information shown in Table 6 into the data storage 5015. The status of each microservice/sequence/subsequence can be determined using methods mentioned above by the version manager 70222. And the information of the current version and the status for each microservice/sequence/subsequence included in the upgraded Sequence X may be updated regularly, such as updated every 1 millisecond, etc. Then when checking whether the status of the next microservice/sequence for a sequence instance is "upgrade-complete", the checker 70223 may check the information in the following Table 6 in the data storage 5012 to determine the status of the next microservice/sequence for the sequence instance.

TABLE 6

| Microservice name/<br>sequence name | A | B | D | E | F | X | Y |
|---|---|---|---|---|---|---|---|
| current version deployed | V1 | V1 | V1 | V1 | V1 | V1 | V1 |
| required version | V1 | V2 | V2 | V1 | V1 | V2 | V2 |
| Hot upgraded policy | R | M | M | R | R | M | M |
| Status | F | N | N | F | F | N | N |

F: upgrade-complete; N: upgrade-incomplete

In some embodiments, when checking whether the status of the next microservice or subsequence for a sequence instance is "upgrade-complete", the checker 70223 may check to the version manager 70222 to determine the status of the next microservice/subsequence for the sequence instance. The version manager 70222 may obtain information of the current version, the required version, the hot upgraded policy from the information in such as Table 4 and Table 5 stored in the data storage 5012, and determine the status for each microservice/subsequence included in the upgraded Sequence X using the method mentioned above and feedback to the checker 70223.

In some embodiments, if the checker 70223 determines that the status of the next microservice or subsequence for the sequence instance is "upgrade-complete", the dispatcher 7022 may dispatch the sequence instance to invoke the next microservice/sequence, while if the status of the next microservice/sequence for the sequence instance is "upgrade-incomplete", the dispatcher 7022 may determine the status of the next microservice/subsequence substantially continuously for the sequence instance until the status of the next microservice/subsequence is "upgrade-complete" so as to dispatch to the next microservice/subsequence.

In some embodiments, if the checker 70223 determines that the running sequence instance comprises no unexecuted microservice or subsequence to be hot upgraded, the dispatcher 7022 may dispatch the sequence instance to invoke the next microservice/sequence directly. At this time, it can be determined that the hot upgrade of the running sequence instance is completed. If the hot upgrade of all the running sequence instances is completed, it can be determined that the hot upgrade of the sequence is completed. For a new generated sequence instance after the hot upgrade of the sequence is completed, the hot upgraded sequence can be directly applied.

Figure 9:
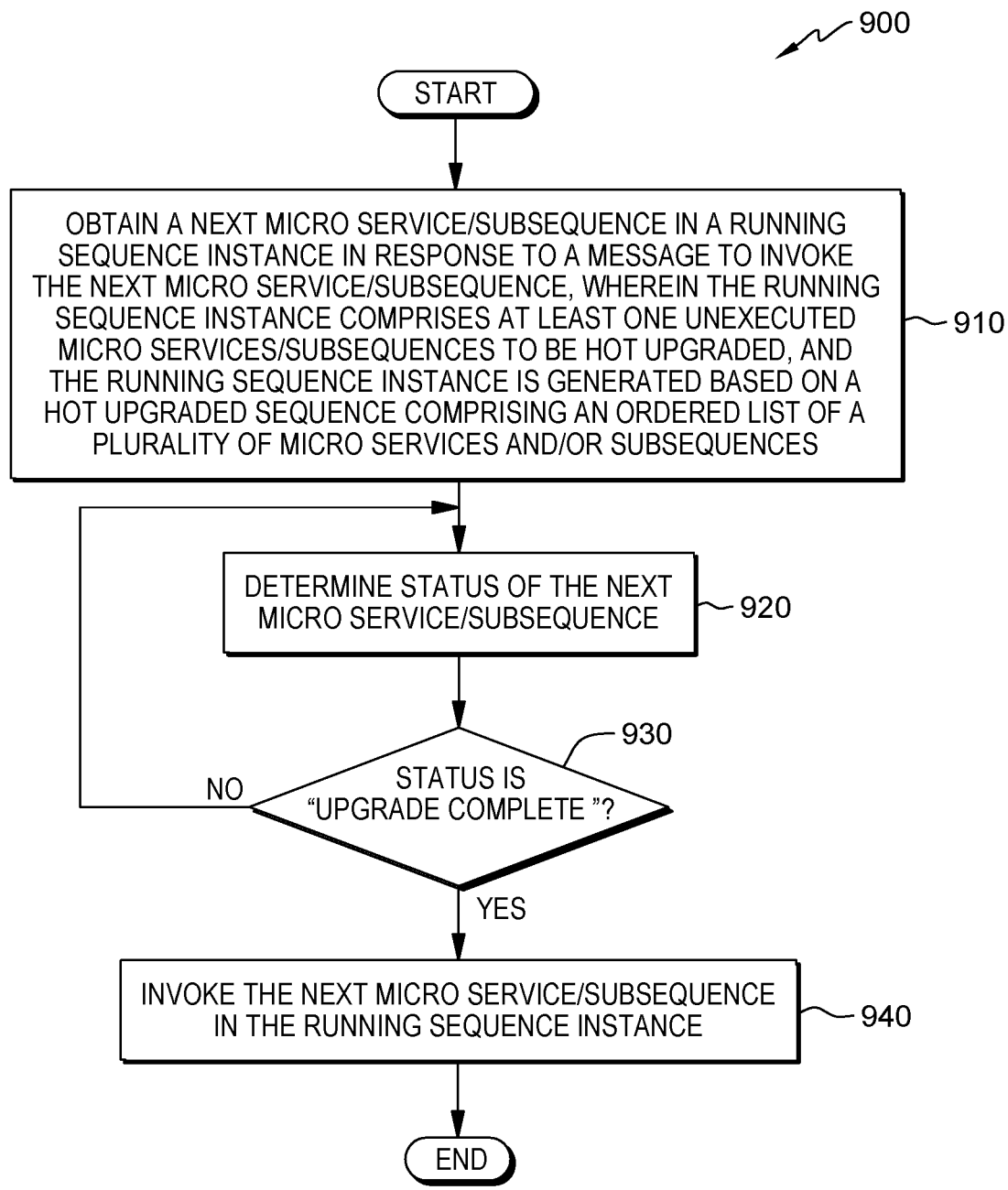
FIG. 9 depicts a method for hot upgrading a microservices sequence in a cloud computing environment according to an embodiment of the present disclosure.

FIG. 9 depicts a flowchart of an exemplary method 900 for a hot upgrade of a sequence in a cloud computing environment according to some embodiments of the present disclosure. The method 900 may be implemented by the dispatcher 7022 of the event processing unit in FIG. 7, or other suitable computer/computing systems. For ease of understanding, the method 900 will be described with reference to FIG. 7.

At 910, the dispatcher 7022 may obtain a next microservice or subsequence in a running sequence instance in response to a message to invoke the next microservice/subsequence, wherein the running sequence instance comprises at least one unexecuted microservices/subsequences to be hot upgraded, and wherein the running sequence instance is generated based on a hot upgraded sequence comprising an ordered list of a plurality of microservices and/or subsequences.

At 920, the dispatcher 7022 may determine status of the next microservice/subsequence.

At 930, the dispatcher 7022 may determine whether the status of the next microservice or subsequence is "upgrade-complete".

At 940, in response to the status of the next microservice or subsequence being "upgrade-complete", the dispatcher 7022 may invoke the next microservice or subsequence in the running sequence instance. Then the method 900 is ended. And in response to the status of the next microservice/subsequence being "upgrade-incomplete", the dispatcher 7022 may go back to 920 to determine the status of the next microservice or subsequence substantially continuously until the status of the next microservice/subsequence is "upgrade-complete".

Once receiving a next message to invoke a next microservice/subsequence, the dispatcher 7022 may execute the method 900 again so as to finish a hot upgrade for every microservice/subsequence, and for every running sequence instance.

In some embodiments, the status of a microservice or subsequence comprised in a sequence is determined based on at least one of the following: (1) If the microservice/subsequence does not need to be hot upgraded in the sequence, the status of the microservice/subsequence is determined to be "upgrade-complete"; (2) If the microservice/subsequence needs to be hot upgraded in the sequence, and a current version of the microservice/subsequence is different from a required version, the status of the microservice/subsequence is determined to be "upgrade-incomplete"; and (3) If the microservice/subsequence needs to be hot upgraded in the sequence, and if the current version of the microservice/subsequence is the same as the required version, the status of the microservice/subsequence is determined to be "upgrade-complete".

In some embodiments, the status of a subsequence comprised in a sequence is determined based on at least one of the following: (1) If the subsequence does not need to be hot upgraded in the sequence, the status of the subsequence is determined to be "upgrade-complete"; (2) If the subsequence needs to be hot upgraded in the sequence, and a current version of the subsequence is the same as a required version, the status of the subsequence is determined to be "upgrade-complete"; (3) If the subsequence needs to be hot upgraded in the sequence, the current version of the subsequence is different from the required version, and a current version of a first microservice in the subsequence is the same as a required version, the status of the subsequence is determined to be "upgrade-complete"; and (4) If the subsequence needs to be hot upgraded in the sequence, the current version of the subsequence is different from the required version, and the current version of a first microservice in the subsequence is different from the required version, the status of the subsequence is determined to be "upgrade-incomplete".

In some embodiments, the obtaining a next microservice or subsequence to be invoked for a running sequence instance comprises: the dispatcher 7022 may obtain the ordered list of a plurality of microservices and/or subsequences of the sequence. Then the dispatcher 7022 may determine whether the running sequence instance comprises at least one unexecuted microservices/subsequences to be hot upgraded. If yes, the dispatcher 7022 may obtain a microservice/subsequence currently being invoked in the running sequence instance and further obtain a next microservice/subsequence to be invoked in the running sequence instance based on the microservice/subsequence currently being invoked and the ordered list.

In some embodiments, if the running sequence instance comprises no unexecuted microservice or subsequence to be hot upgraded, the dispatcher 7022 may invoke the next microservice/subsequence in the running sequence instance. At this time, it can be determined that the hot upgrade of the running sequence instance is completed. In some embodiments, if hot upgrade of all running sequence instances being completed, it can be determined that the hot upgrade of the sequence is completed.

The proposed method can make it possible for a sequence to be hot upgraded.

It should be noted that the processing of managing conditional parallel cloud services according to embodiments of the present disclosure could be implemented by computer system/server 12 of FIG. 1.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for upgrading a sequence of microservices, comprising:
   responsive to a message to invoke a next microservice or subsequence, obtaining, by one or more processors, the next microservice or subsequence in a running sequence instance, wherein the running sequence instance comprises at least one unexecuted microservice or subsequence to be hot upgraded, and wherein the running sequence instance is generated based on a sequence to be hot upgraded comprising an ordered list of a plurality of microservices or subsequences;
   determining, by the one or more processors, a status of the next microservice or subsequence in the running sequence instance;
   responsive to the status of the next microservice or subsequence being upgrade-complete, invoking, by the one or more processors, the next microservice or subsequence in the running sequence instance; and
   responsive to the status of the next microservice or subsequence being upgrade-incomplete, determining, by the one or more processors, the status of the next microservice or subsequence substantially continuously until the status of the next microservice or subsequence is upgrade-complete.

2. The computer-implemented method of claim 1, wherein the status of the next microservice or subsequence is determined based on at least one of the following:
   the next microservice or subsequence does not need to be hot upgraded in the sequence, and the status of the next microservice or subsequence is determined to be upgrade-complete;
   the next microservice or subsequence needs to be hot upgraded in the sequence, a current version of the next microservice or subsequence is different from a required version, and the status of the next microservice or subsequence is determined to be upgrade-incomplete; and
   the next microservice or subsequence needs to be hot upgraded in the sequence, the current version of the next microservice or subsequence is a required version, and the status of the next microservice or subsequence is determined to be upgrade-complete.

3. The computer-implemented method of claim 1, wherein the status of the next subsequence is determined based on at least one of the following:
   the next subsequence does not need to be hot upgraded in the sequence, and the status of the next subsequence is determined to be upgrade-complete;
   the next subsequence needs to be hot upgraded in the sequence, a current version of the next subsequence is a required version, and the status of the next subsequence is determined to be upgrade-complete;
   the next subsequence needs to be hot upgraded in the sequence, the current version of the next subsequence is different from a required version, a current version of a first microservice in the next subsequence is a required version, and the status of the next subsequence is determined to be upgrade-complete; and
   the next subsequence needs to be hot upgraded in the sequence, the current version of the next subsequence is different from a required version, the current version of a first microservice in the next subsequence is different from a required version, and the status of the next subsequence is determined to be upgrade-incomplete.

4. A computer-implemented method for upgrading a sequence of microservices, comprising:
   responsive to a message to invoke a next microservice or subsequence, obtaining, by one or more processors, the next microservice or subsequence in a running sequence instance, wherein the running sequence instance comprises at least one unexecuted microservice or subsequence to be hot upgraded, and wherein the running sequence instance is generated based on a sequence to be hot upgraded comprising an ordered list of a plurality of microservices or subsequences;
   determining, by the one or more processors, a status of the next microservice or subsequence in the running sequence instance; and
responsive to the status of the next microservice or subsequence being upgrade-complete, invoking, by the one or more processors, the next microservice or subsequence in the running sequence instance;

wherein the obtaining a next microservice or subsequence to be invoked for a running sequence instance comprises:
  obtaining, by the one or more processors, the ordered list of a plurality of microservices or subsequences of the sequence,
  determining, by the one or more processors, whether the running sequence instance comprises at least one unexecuted microservices/subsequences to be hot upgraded, and
  responsive to the running sequence instance comprising at least one unexecuted microservice or subsequence to be hot upgraded:
    obtaining, by the one or more processors, a microservice or subsequence currently being invoked in the running sequence instance, and
    obtaining, by the one or more processors, a next microservice or subsequence to be invoked in the running sequence instance based on the microservice or subsequence currently being invoked and the ordered list.

5. The computer-implemented method of claim 4, the method further comprising: responsive to the running sequence instance comprising no unexecuted microservice or subsequence to be hot upgraded, invoking, by the one or more processors, the next microservice or subsequence in the running sequence instance.

6. A system for upgrading a sequence of microservices, comprising:
  a processing unit; and
  a memory coupled to the processing unit and storing instructions thereon, the instructions, when executed by the processing unit, performing actions including:
    responsive to a message to invoke a next microservice or subsequence, obtaining the next microservice or subsequence in a running sequence instance, wherein the running sequence instance comprises at least one unexecuted microservice or subsequence to be hot upgraded, and wherein the running sequence instance is generated based on a sequence to be hot upgraded comprising an ordered list of a plurality of microservices or subsequences;
    determining a status of the next microservice or subsequence in the running sequence instance; and
    responsive to the status of the next microservice or subsequence being upgrade-complete, invoking the next microservice or subsequence in the running sequence instance; and
    responsive to the status of the next microservice or subsequence being upgrade-incomplete, determining the status of the next microservice or subsequence substantially continuously until the status of the next microservice or subsequence is upgrade-complete.

7. The system of claim 6, wherein the status of the next microservice or subsequence is determined based on at least one of the following:
  the next microservice or subsequence does not need to be hot upgraded in the sequence, and the status of the next microservice or subsequence is determined to be upgrade-complete;
  the next microservice or subsequence needs to be hot upgraded in the sequence, a current version of the next microservice or subsequence is different from a required version, and the status of the next microservice or subsequence is determined to be upgrade-incomplete; and
  the next microservice or subsequence needs to be hot upgraded in the sequence, the current version of the next microservice or subsequence is a required version, and the status of the next microservice or subsequence is determined to be upgrade-complete.

8. The system of claim 6, wherein the status of the next subsequence is determined based on at least one of the following:
  the next subsequence does not need to be hot upgraded in the sequence, and the status of the next subsequence is determined to be upgrade-complete;
  the next subsequence needs to be hot upgraded in the sequence, a current version of the next subsequence is a required version, and the status of the next subsequence is determined to be upgrade-complete;
  the next subsequence needs to be hot upgraded in the sequence, the current version of the next subsequence is different from a required version, a current version of a first microservice in the next subsequence is a required version, and the status of the next subsequence is determined to be upgrade-complete; and
  the next subsequence needs to be hot upgraded in the sequence, the current version of the next subsequence is different from a required version, the current version of a first microservice in the next subsequence is different from a required version, and the status of the next subsequence is determined to be upgrade-incomplete.

* * * * *